United States Patent
Wilkerson et al.

(10) Patent No.: US 7,624,258 B2
(45) Date of Patent: Nov. 24, 2009

(54) USING COMPUTATION HISTORIES TO MAKE PREDICTIONS

(75) Inventors: Chris B. Wilkerson, Portland, OR (US); Jared W. Stark, Portland, OR (US); Renju Thomas, College Park, MD (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/550,747

(22) Filed: Oct. 18, 2006

(65) Prior Publication Data

US 2007/0088936 A1   Apr. 19, 2007

Related U.S. Application Data

(63) Continuation of application No. 10/330,492, filed on Dec. 27, 2002, now Pat. No. 7,143,272.

(51) Int. Cl.
    *G06F 9/00* (2006.01)
(52) U.S. Cl. ...................................................... 712/240
(58) Field of Classification Search .................. 712/240
    See application file for complete search history.

(56) References Cited

U.S. PATENT DOCUMENTS

| | | | | |
|---|---|---|---|---|
| 4,370,711 A | * | 1/1983 | Smith | 712/240 |
| 5,828,874 A | * | 10/1998 | Steely et al. | 712/240 |
| 5,996,060 A | | 11/1999 | Mendelson et al. | |
| 6,173,384 B1 | | 1/2001 | Weaver | |
| 6,247,122 B1 | | 6/2001 | Henry et al. | |
| 6,272,623 B1 | * | 8/2001 | Talcott | 712/239 |
| 6,353,882 B1 | | 3/2002 | Hunt | |
| 6,393,544 B1 | | 5/2002 | Bryg et al. | |
| 6,418,530 B2 | * | 7/2002 | Hsu et al. | 712/237 |
| 6,427,206 B1 | | 7/2002 | Yeh et al. | |
| 6,510,511 B2 | * | 1/2003 | Talcott | 712/240 |
| 6,516,409 B1 | * | 2/2003 | Sato | 712/239 |
| 6,601,161 B2 | | 7/2003 | Rappoport et al. | |
| 6,766,443 B2 | * | 7/2004 | Sinharoy | 712/239 |
| 6,779,108 B2 | | 8/2004 | Ju et al. | |
| 6,813,763 B1 | | 11/2004 | Takahashi et al. | |

OTHER PUBLICATIONS

Thomas, Renju, Franklin, Manoj, Wilkerson, Chris, Stark, Jared. "Improving branch prediction by dynamic dataflow-based identification of correlated branches from a large global history" Proceedings of the 30th annual international symposium on computer architecture, pp. 314-323, 2003.*

(Continued)

*Primary Examiner*—Eddie P Chan
*Assistant Examiner*—Jacob Petranek
(74) *Attorney, Agent, or Firm*—Caven & Aghevli LLC

(57) ABSTRACT

Associated with an instruction in a program is a computation history. The computation history represents all objects that affect the result of the instruction, such objects including (but not limited to) registers, memory locations, static values, and instruction program counters. The computation history may be used to make a prediction about a property of the instruction.

24 Claims, 10 Drawing Sheets

OTHER PUBLICATIONS

Thomas, Renju, Franklin, Manoj. "Using dataflow based context for accurate branch prediction" High performance computing 2002, pp. 587-596.*

Sazeides, Yiannakis. "Dependence Based Value Prediction" Department of Computer Science University of Cyprus, Feb. 2002. pp. 1-23. Nicosia, Cyprus.

Thomas, et al. "Using Dataflow Based Context for Accurate Branch Prediction" High Performance Computing 2002. 9th International Conference. pp. 587-596.

Sathe, et al. "Techniques For Performing Highly Accurate Data Value Prediction" Microprocessors and Microsystems 22 (1998). pp. 303-313.

Reches, et al. "Implementation and Analysis of Path History in Dynamic Branch Prediction Schemes" IEEE transactions on Computers, vol. 47, No. 8, Aug. 1998. pp. 907-912.

Thomas, et al. "Using Dataflow Based Context For Accurate Value Prediction" International Conference on Parallel Architectures and Compilation Techniques, Sep. 8-12, 2001. pp. 107-117.

Jin, et al. "Branch Prediction of Conditional Nested Loops Through an Address Queue" Proceeding of the ISCA 14th Conference Parallel and Distributed Computing Systems. Aug. 2001.

Passos, et al. "Schedule-based Multi-dimensional Retiming on Data Flow Graphs" IEEE 1994.

Passos, et al. "Achieving Full Parallelism Using Multidimensional Retiming" IEEE 1996.

Chao, et al. "Static Scheduling of Uniform Nested Loops" IEEE 1993.

Lipasti, et al. "Exceeding the Dataflow Limit Via Value Prediction" IEEE 1996.

* cited by examiner

USING COMPUTATION HISTORIES TO MAKE PREDICTIONS

RELATED APPLICATION DATA

This application is a continuation of U.S. patent application Ser. No. 10/330,492, filed Dec. 27, 2002, now U.S. Pat. No. 7,143,272 which is hereby incorporated by reference for all intents and purposes.

FIELD

This invention pertains to program execution, and more particularly to improving the efficiency in executing program instructions.

BACKGROUND

When computers were first built, the objective was to make programs run. There was no concern about making computers efficient: it was enough that they executed the programs written for the computers. Thus, the processor read an instruction and executed it, then went back to the program for the next instruction.

As more has become known about computer design, engineers have become able to design processors that are more efficient than simple "fetch and execute" processors. Modern processors include "pipelines": at any moment, different parts of the processor are working on different instructions. For example, while the core of the central processing unit is executing an instruction, another part of the processor might be loading a data value from memory that will be needed by a future instruction.

One area of processor design that has received extensive study and thought is branch processing. Depending on an associated data value, after a branch instruction is executed, control may continue at one of two (or more) different points. This creates a problem for modern processors: until the outcome of the branch instruction is known, any preprocessing of later instructions may be in vain.

To account for this, modern processors perform branch prediction. Rather than waiting for the branch instruction to execute and the correct path through the program to be known, the processor makes a guess. But if the processor guesses incorrectly, any preprocessing along the projected path is wasted. For example, if both possible follow-up preprocessed, then the wrong value will be in the register. The processor must then unwind the preprocessing performed on the wrong path. If the processor guesses incorrectly, execution might be slower than if the processor had simply waited until the branch instruction was executed.

Rather than guessing blindly, branch predictors try to make educated guesses. To accomplish this, they make certain assumptions. One possible assumption is that the outcome at a particular branch instruction is dependent solely on the prior outcomes at that branch. Another, more general assumption is that the outcome is dependent on some (fixed size) set of instructions preceding the branch instruction. There are other variations.

FIG. 1 shows a computer system executing a program according to the prior art. In FIG. 1, computer system 105 includes computer 110, installed into which is memory 115. Loaded in memory 115 is program 130, a portion of which is shown in FIG. 1. Program 130 includes branch instruction 135.

Under the assumption that the most frequent direction taken for a branch is the most likely, using table 140, a branch predictor may predict whether a branch is taken or not. As shown in row 145, instruction 135 has branched more times than not (the counter is incremented each time the branch is taken, and decremented each time it is not). Thus, the branch predictor would guess that the branch will be taken again.

Under the assumption that the direction taken by a branch is affected by the preceding instructions, the branch predictor looks at instructions 150 (which include instruction 135) and hashes their program counters together. This produces an index that the branch predictor may use to access table 155. As indicated at row 160, using this approach, the branch predictor would guess that the branch will not be taken.

But consider a branch predictor that that looks at the last five instructions before the branch. There is no guarantee that any of these instructions have any impact on the data value that controls the outcome of the branch. Likewise, there is no guarantee that these instructions are the only instructions that affect a prediction. There might be an older instruction that is highly pertinent to the outcome of the branch.

A need remains for a way to more accurately predict branches and other properties of instructions, that addresses these and other problems associated with the prior art.

DETAILED DESCRIPTION

Figure 1:
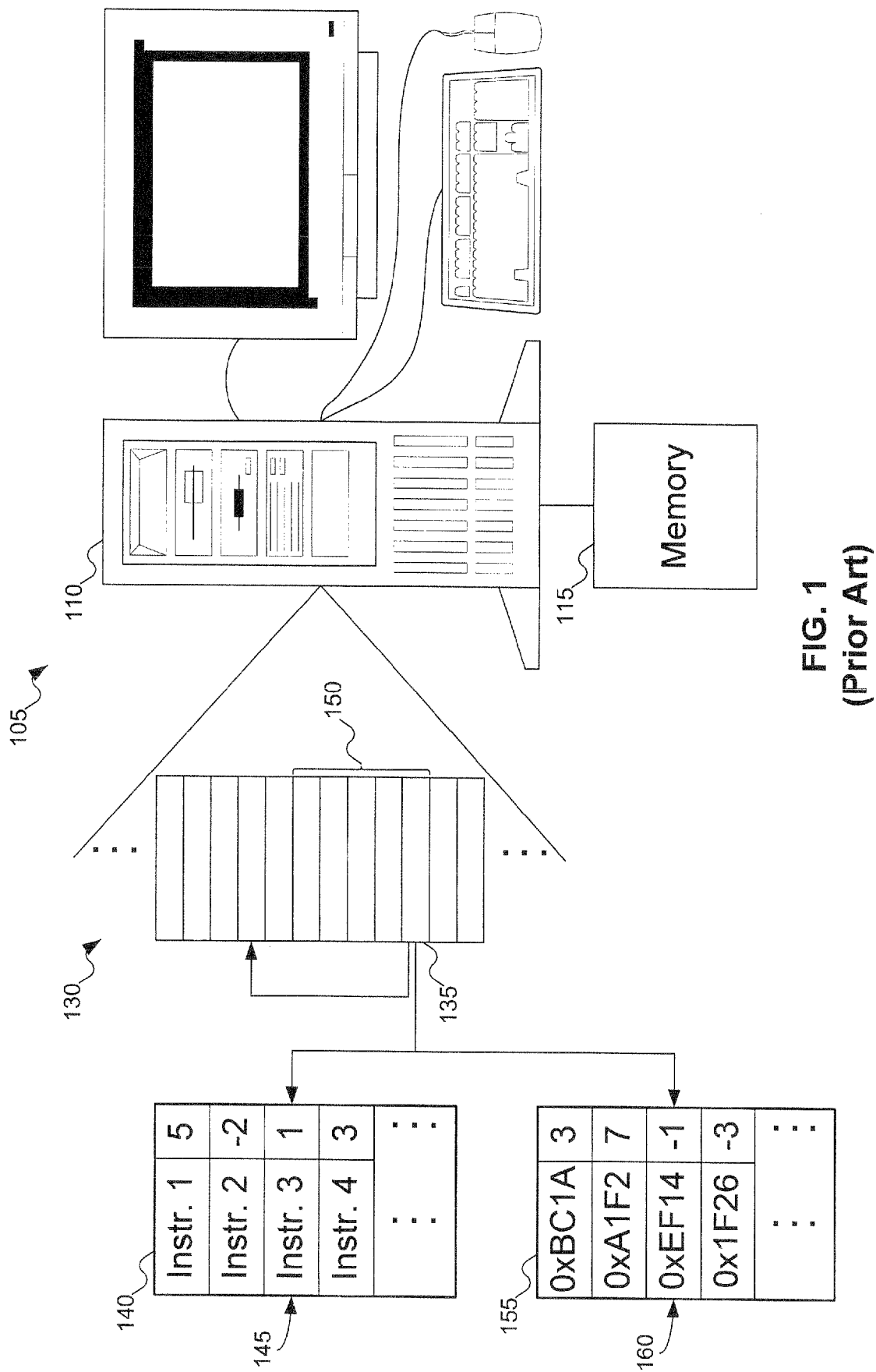
FIG. 1 shows a computer system executing a program according to the prior art.
Figure 2:
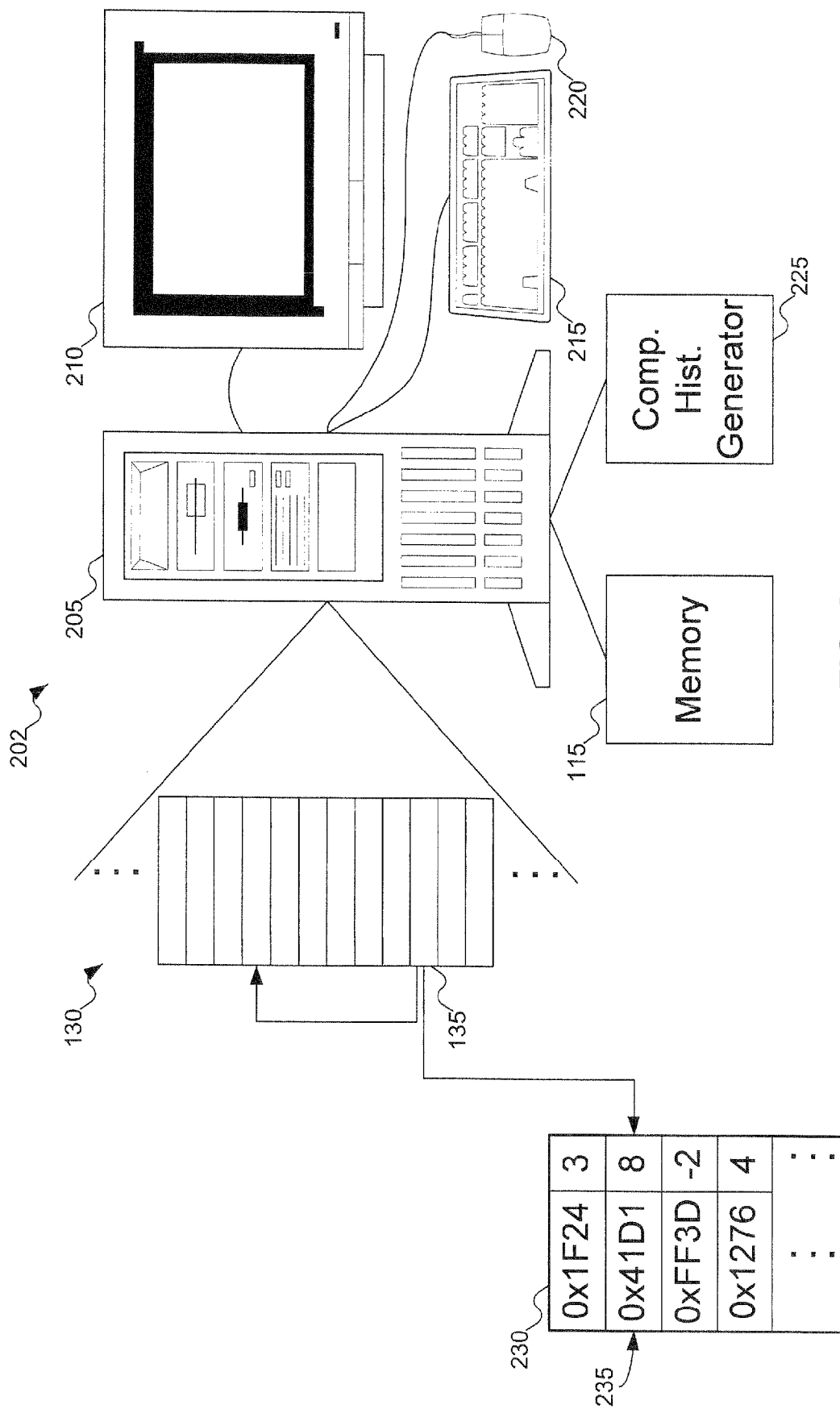
FIG. 2 shows a computer system making predictions about instruction properties according to an embodiment of the invention.

FIG. 2 shows a computer system making predictions about instruction properties according to an embodiment of the invention. In FIG. 2, computer system 202 is very similar to computer system 105 of FIG. 1. Computer system 202 includes computer 205, monitor 210, keyboard 215, and mouse 220. A person skilled in the art will recognize that although computer system 202 is shown as a desktop personal computer, the invention is not limited to any specific type of computer. For example, computer system 202 could also be an Internet appliance, lacking any of computer 205, keyboard 215, or mouse 220. Computer system 202 could also be, among others, a personal digital assistant (PDA), or a wireless computer. Optional equipment not shown as part of computer system 202 in FIG. 2 are other input/output devices, such as a printer or a modem. Also not shown in FIG. 2 are some of the conventional internal components of computer system 202: e.g., a central processing unit, file system, network interface, etc.

Computer 205 includes computation history generator 225. Computation history generator 225 is responsible for generating computation histories for instructions in program 130. Specific about what a computation history is and how it is used is discussed further with reference to FIGS. 3-5. In one embodiment, computation history generator 225 is part of a central processing unit for computer 205. In another embodiment, computation history generator 225 is a hardware component external to the central processing unit. In a third embodiment, computation history generator 225 is software stored in memory 115 during operation of the computer.

When computer system 202 needs to make a prediction about a property of an instruction, computation history generator 225 generates a computation history for the instruction. The computation history may then be used to determine an index to lookup table 230, which stores predictions about instruction properties. For example, if the property in question is the direction of branch instruction 135, the computation history for instruction 135 may be generated by computation history generator 225. Then, the computation history may be used to determine index 0x41D1, which indexes to row 235 of lookup table 230. The prediction about the branch is that the branch will be taken (indicated by the positive counter value).

Figure 3:
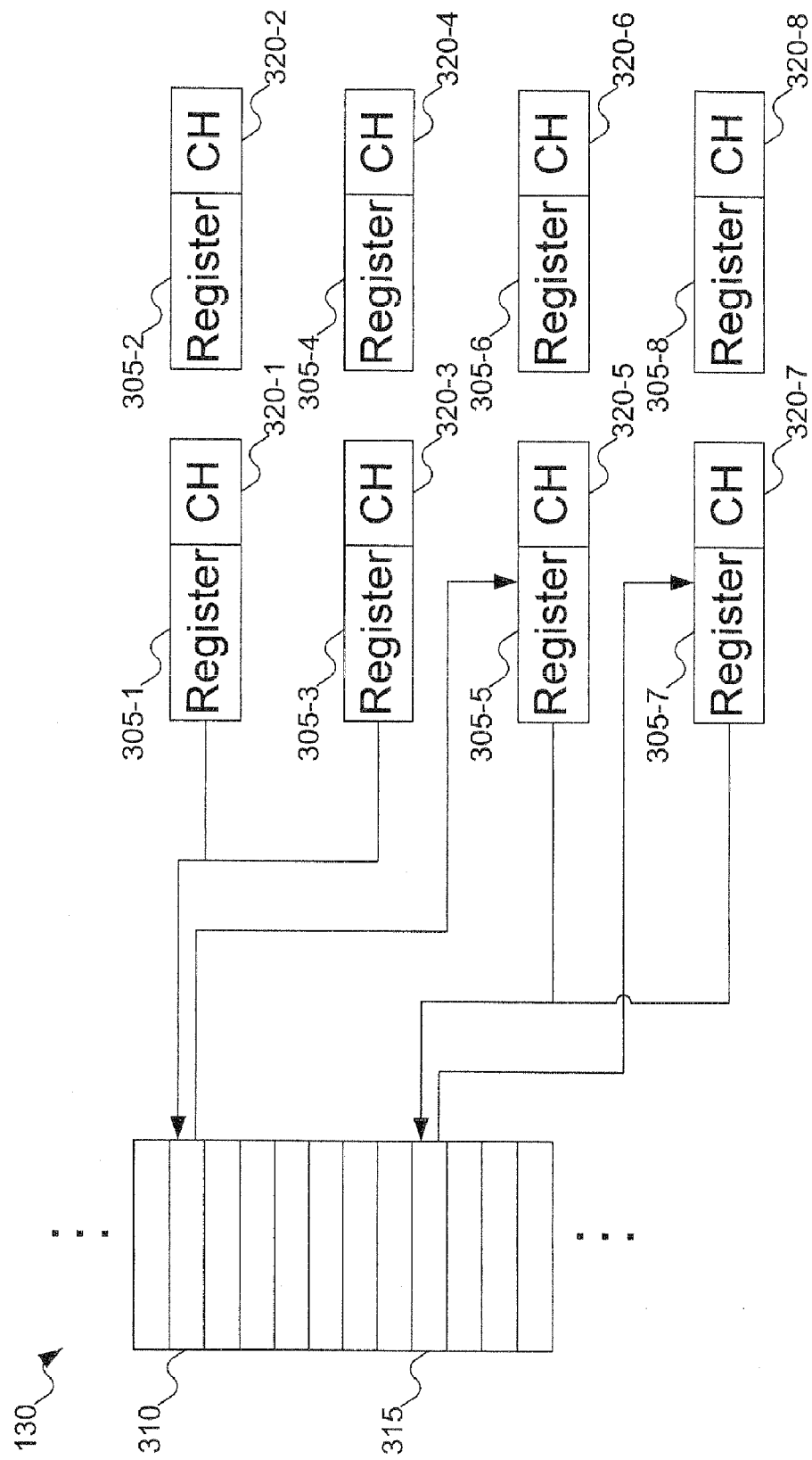
FIG. 3 shows registers with associated computation histories in the computer system of FIG. 2, according to an embodiment of the invention.

FIG. 3 shows registers with associated computation histories in the computer system of FIG. 2 according to an embodiment of the invention. In FIG. 3, program 130 is shown, as are registers 305-1 through 305-8, which are registers in the central processing unit. Various instructions use the registers: for example, instruction 310 uses registers 305-1, 305-3, and 305-5, whereas instruction 315 uses registers 305-5 and 305-7.

Registers may be source registers or destination registers (or both), depending on whether the instruction is reading a value from the register or writing a value to the register. For example, register 305-5 is a destination register for instruction 310, but a source register for instruction 315 (the directions of the arrows indicate whether a register is a source or destination register).

Associated with each register is a computation history. For example, register 305-1 has associated computation history 320-1, register 305-2 has associated computation history 320-2, and so on. Each computation history is an amalgamation of information about all the things that affect the current data value in the register. Things that affect the current data value of the register may include other register values, static constants, memory values, the instructions that write to the register, and so on. To simplify generating computation histories, in one embodiment only static data are used to generate computation histories. The adjective static implies that the things that are used in generating the computation history are things (usually values of some sort) known at the time the program is compiled. (Compare the term static with the terms dynamic and run-time, which imply that things are known at the time the program is executed.) In other words, computation histories are not dependent on the data that are actually used in the program, and are limited to things that are always the same each time the program is executed.

To generate the computation history for a register, first the computation histories and other static data for objects that affect the register are determined. Typically, these are computation histories for other registers used by the instruction that is writing to the register. Other static data may be used: for example, the program counter of the instruction writing to the register. These computation histories and other static data are hashed together using a hashing algorithm. The result is a computation history, which may be associated with the register in its current state.

For example, consider an instruction like ADD R1, R2, R3, which instructs the processor to read the values from registers R1 and R2, add them together, and store the result in register R3. To compute the computation history for register R3 after the execution of this instruction, the computation histories for registers R1 and R2 are read, and optionally the program counter for the ADD instruction. These values are hashed together, resulting in a new computation history, which may be associated with register R3 (at least until such time as register R3 is assigned a new value).

It is common to call the set of registers (that is, registers 305-1 through 305-8) a register file. In this context, as values change in the registers, the register file changes accordingly. In a similar manner, computation histories 320-1 through 320-8 can be called a computation history file. As the computation histories associated with individual registers change, so too does the computation history file.

Figure 4:
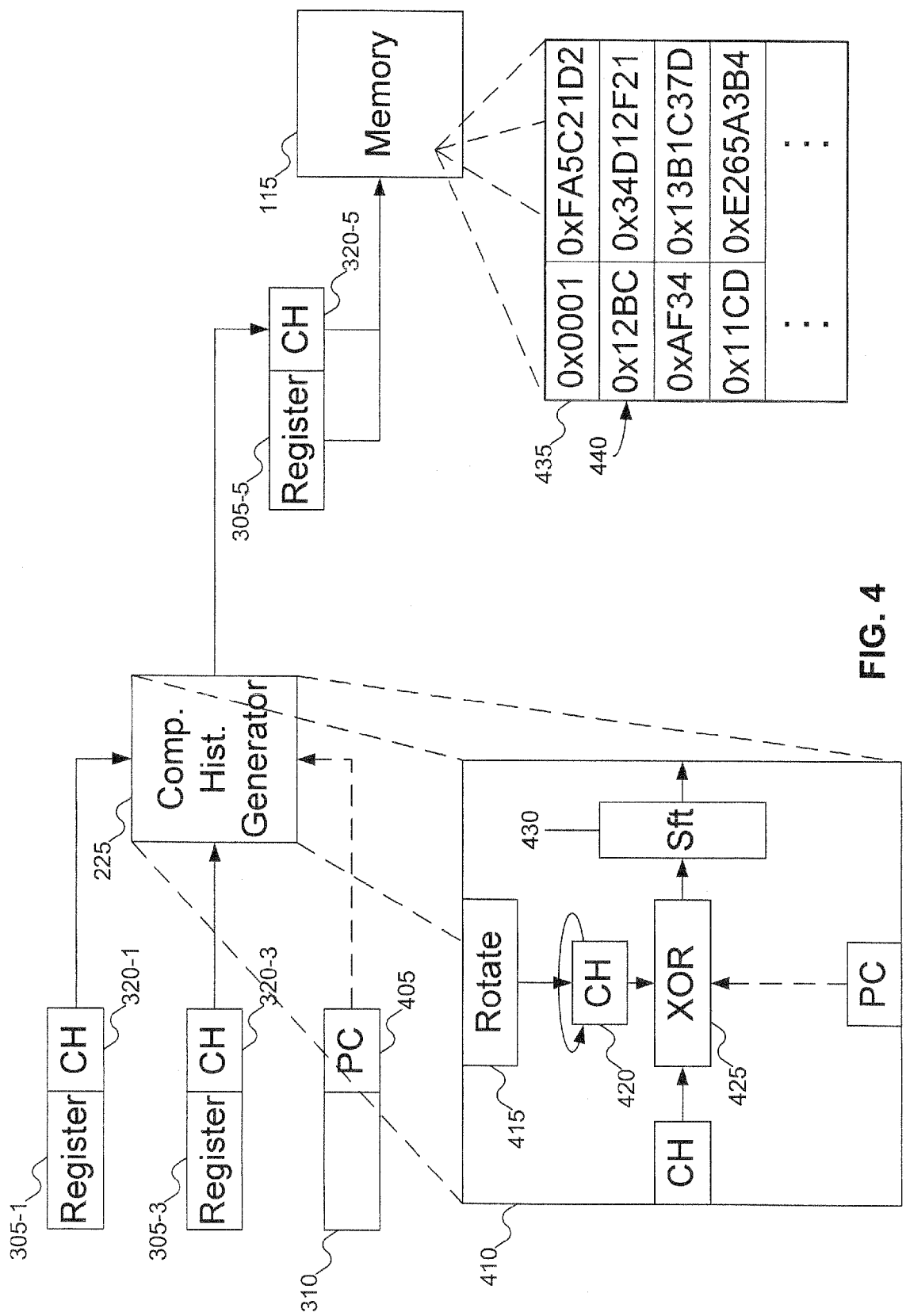
FIG. 4 shows the generation of a computation history for a register of FIG. 3 from other registers, according to an embodiment of the invention.

FIG. 4 illustrates this process in detail using a particular hashing algorithm. In FIG. 4, the computation histories for the source registers are determined: in this case, computation histories 320-1 and 320-3. Since the hashing algorithm uses the program counter of the instruction, program counter 405 is also determined. This information is input to computation history generator 225, the detail of which is shown in box 410. As shown in box 410, one of the computation histories is rotated, resulting in rotated computation history 420. This is combined with the other computation history and program counter 405 using an exclusive OR (XOR) operation, as shown in box 425. The result is then shifted by box 430. The final output is the new computation history for register 305-5.

Some explanation for the hashing algorithm shown in box 410 is in order. First, if the same computation history is used twice (which may happen if the same register is used twice as a source operand for an instruction) then the exclusive OR (XOR) operation of the same operand unrotated would return a zero. To avoid this, one of the computation histories may be rotated. Second, by shifting the result, the computation histories may be aged. This helps the computation histories to reflect the fact that more recent instructions have a greater impact on the value of the computation history than older instructions.

In an embodiment of the invention, a computation history lasts only as long as it is being used. For example, assume that register 305-5 currently stores a value, and computation history 320-5 currently stores a computation history for the value in register 305-5. If the next instruction loads a value from memory into register 305-5, a new computation history 320-5 will be generated and the old computation history lost. In another embodiment, rather than discarding the computation history, the computation history may be placed in computation history stack 435. Computation history stack 435 is a place in memory where computation histories can be saved when the value in the corresponding register is saved to memory. Then, if the value with which the computation history is ever loaded back into a register, the corresponding computation history may recovered from computation history stack 435. For example, as the value of register 305-5 is swapped out to memory, row 440 shows that the computation history associated with the value is 0x34D12F21.

Although FIGS. 3-4 show computation histories being associated with registers, they may also be associated with instructions. The computation history for an instruction may be the computation history of an operand, a computation history generated from the computation histories of the source operands (and possibly other static information), or the computation history of the destination operand. For example, in predicting a branch instruction, the computation history of the source register may be loaded as the computation history for the instruction.

A person skilled in the art will recognize that the generation of computation histories is recursive: that is, generating one computation history depends on knowing a previous computation history. By generating computation histories recursively, each computation history identifies (via the hash) all values that affected the current value of the register. There is no limit on the number of objects that may affect the computation history: the computation history effectively traces the entire genesis of the current data value in the register.

A person skilled in the art will also recognize that instructions may have as operands objects other than registers. For example, a LOAD instruction loads a data value (perhaps from memory, if direct memory addressing is permitted, perhaps a static value) into a register. How this affects the computation history is discussed further with reference to FIG. 5 below.

Figure 5:
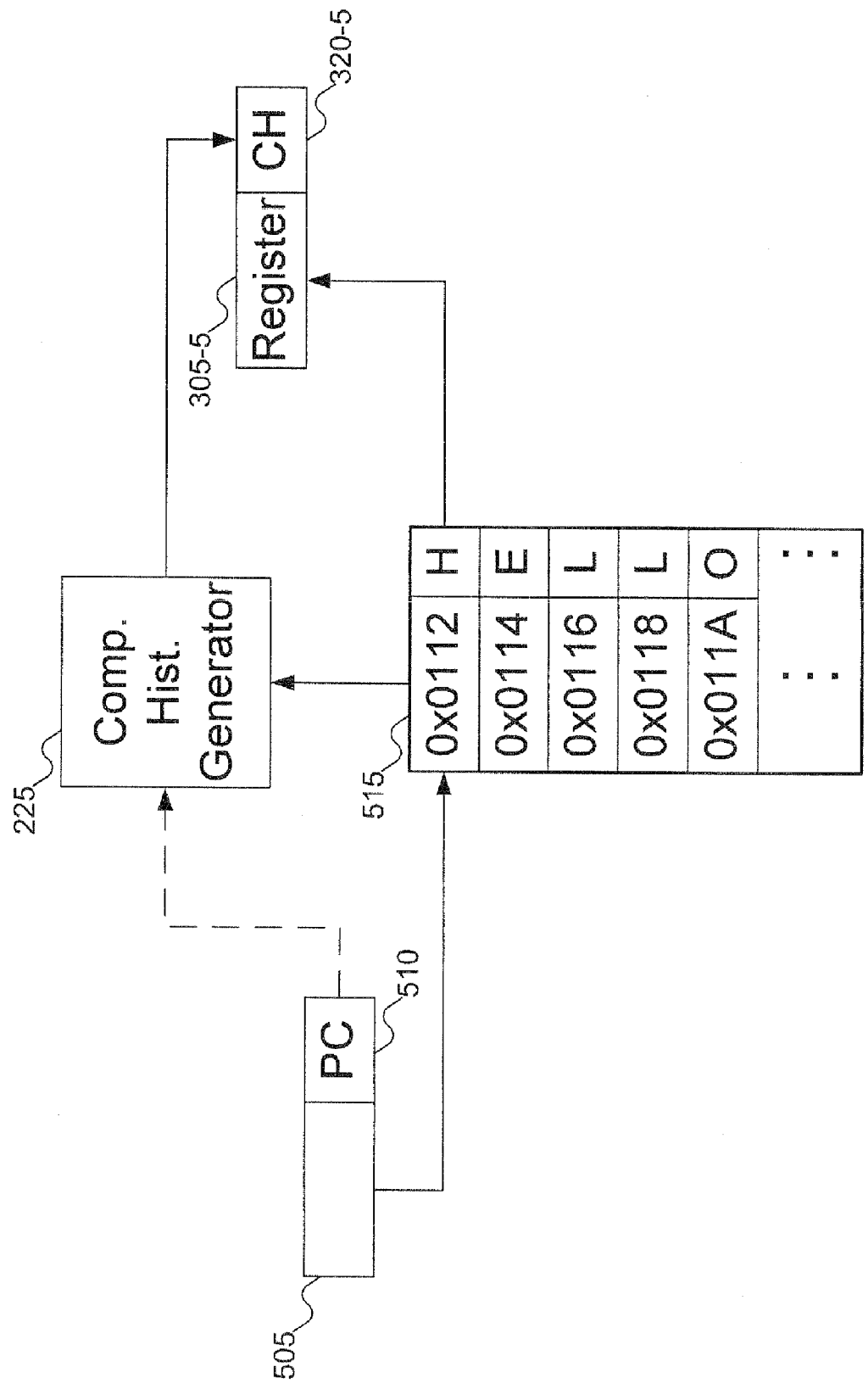
FIG. 5 shows the generation of a computation history for a register of FIG. 3 without using computation histories for other registers, according to an embodiment of the invention.

FIG. 5 shows the generation of a computation history for a register of FIG. 3 without using computation histories for other registers, according to an embodiment of the invention. In FIG. 5, instruction 505 might be a LOAD instruction, loading a value from memory 515 into the register. The computation history for load instruction 505 is typically generated ignoring any source register(s) used by load instruction 505, but the computation history for load instruction 505 may use the computation history of the source register(s) or the values in the source register(s). For example, the address of the memory location from which the value is being loaded may be stored in a register for load instruction 505. (Computation history generator 225 may then optionally hash that value with program counter 510 for instruction 505.) This new value becomes the computation history for register 305-5.

Computation histories are a specific instance of a more general concept: the data flow graph. A data flow graph is a representation of the data flow in a program. Data flow graphs may be generated dynamically, using run-time data (such as the actual values associated with variables in the program execution) or may be generated statically, using data available only at compile-time. Data flow graphs may be used in the same manner as computation histories: to make predictions about properties of instructions, such as the direction taken by a branch instruction.

Figure 6:
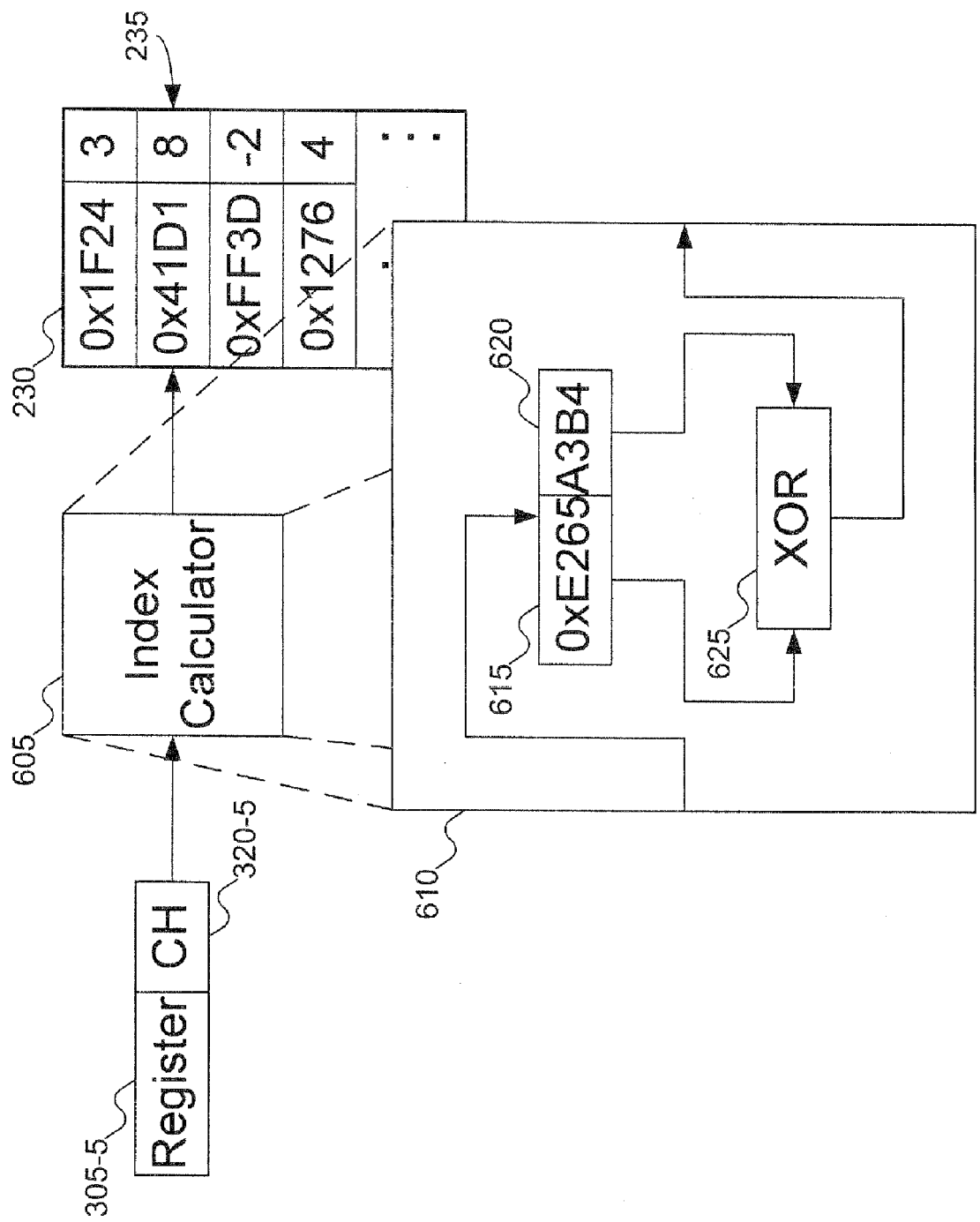
FIG. 6 shows the generation of an index into a lookup table in the computer system of FIG. 2, according to an embodiment of the invention.

FIG. 6 shows the generation of an index into a lookup table in the computer system of FIG. 2, according to an embodiment of the invention. Obviously, the computation history may be used directly to index into lookup table 230. But because each additional bit used in the index to lookup table 230 doubles the size of lookup table 230, it is desirable to keep the size of lookup table 230 from becoming too big. Thus, even though FIG. 6 shows 32-bit computation histories, the index size for lookup table 230 is only 16 bits. To reduce the size of the computation history to the size of an index, index calculator 605 may be used. Box 610 shows the details of index calculator 610 in one embodiment.

In box 610, the computation history is split in half. The two halves 615 and 620 are then hashed, in FIG. 6 using an exclusive OR (XOR) operation in box 625. The result is a 16-bit index, which may be used to index into lookup table 230. If a smaller index is desired, the process may be repeated, reducing the index to 8 bits. A person skilled in the art will also recognize that other techniques may be used to reduce the size of the computation history to the size of an index into lookup table 230.

Notice that lookup table 230 may store any kind of prediction about the data. The most immediate use of lookup table 230 is to store a branch prediction that is used by a branch predictor, but there is no limitation on what kind of prediction may be stored. For example, lookup table 230 may be used to make predications about memory lookup addresses or the data values taken on by variable.

Figure 7A:
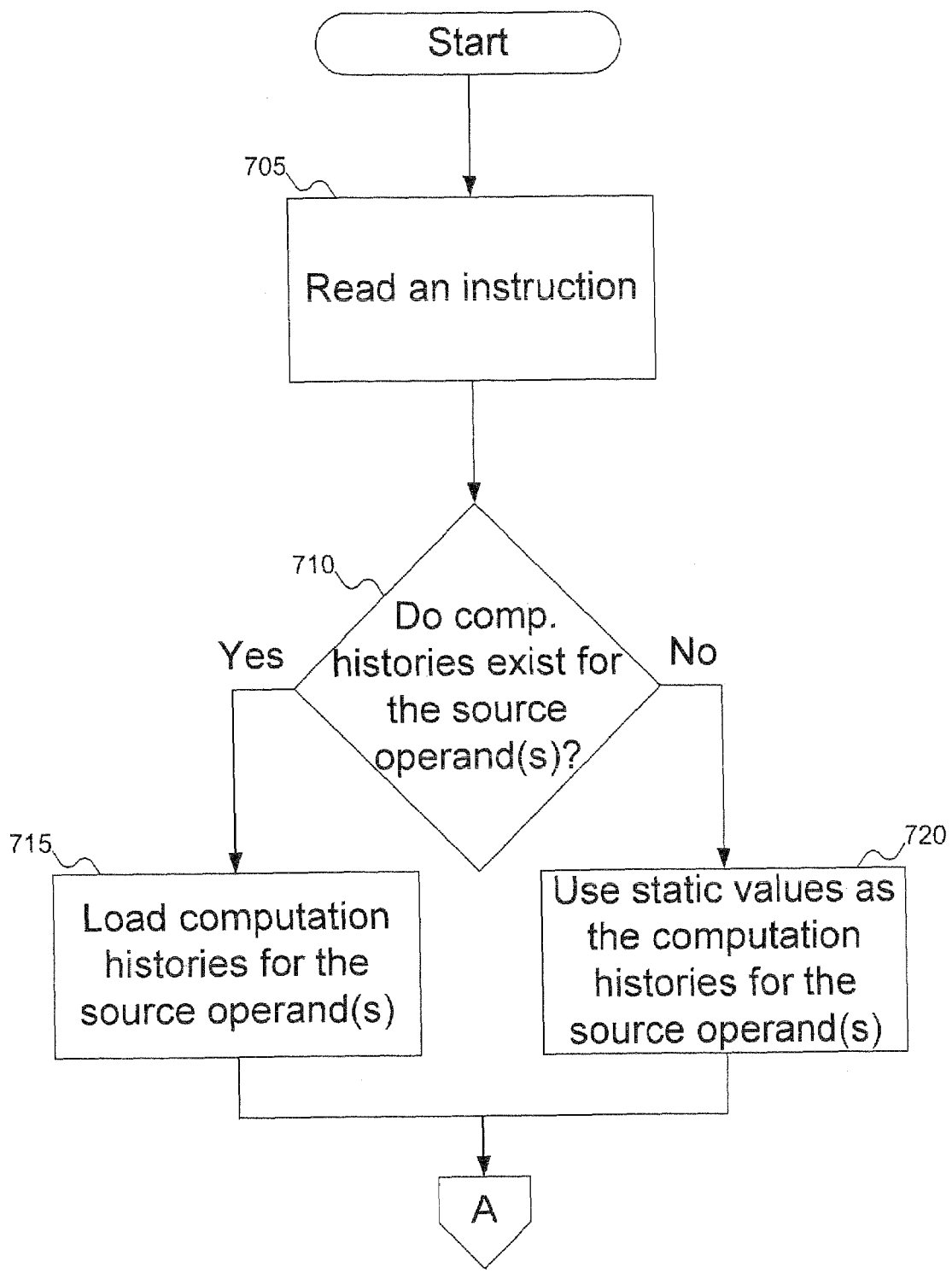
FIGS. 7A-7B show a flowchart of the procedure for constructing computation histories for an instruction in the computer system of FIG. 2, according to an embodiment of the invention.
Figure 7B:
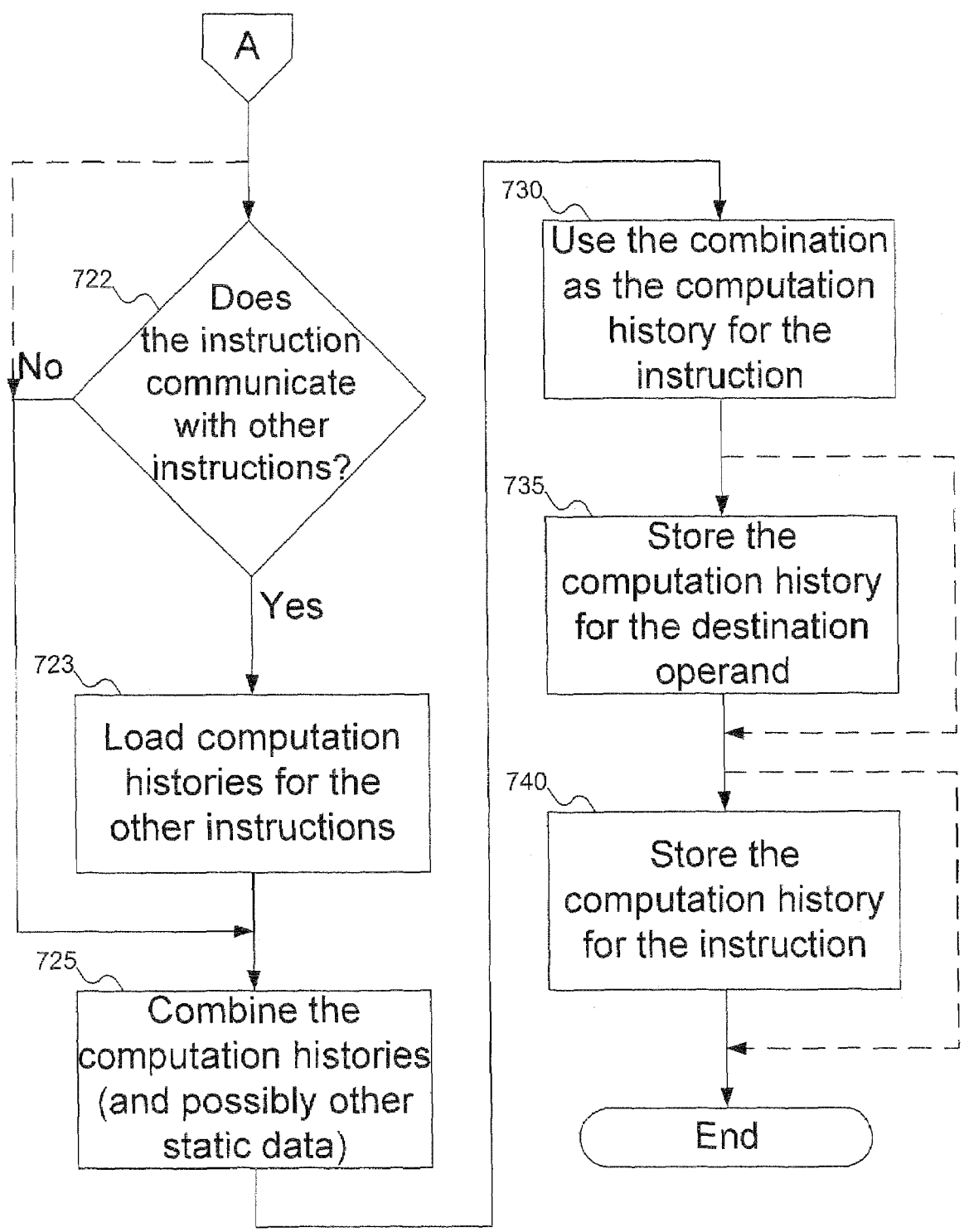

FIGS. 7A-7B show a flowchart of the procedure for constructing computation histories for an instruction in the computer system of FIG. 2, according to an embodiment of the invention. In FIG. 7A, at block 705, an instruction is read. At decision point 710, the source operands are checked to see if they have computation histories. If so, then at block 715 the computation histories for the source operands are loaded. If not, then at block 720 static values are used for the computation histories for the source operands. (As discussed above with reference to FIG. 5, examples of instructions that may not have source computation histories are instructions that access memory or that load a static value into a register.)

At block 725 (FIG. 7B), the computation histories are combined. Other static data may also be used at this time. At block 730, the result is determined to be the computation history for the instruction. Finally, at block 735, the computation history is (optionally) stored with the destination operand of the instruction.

Figure 8:
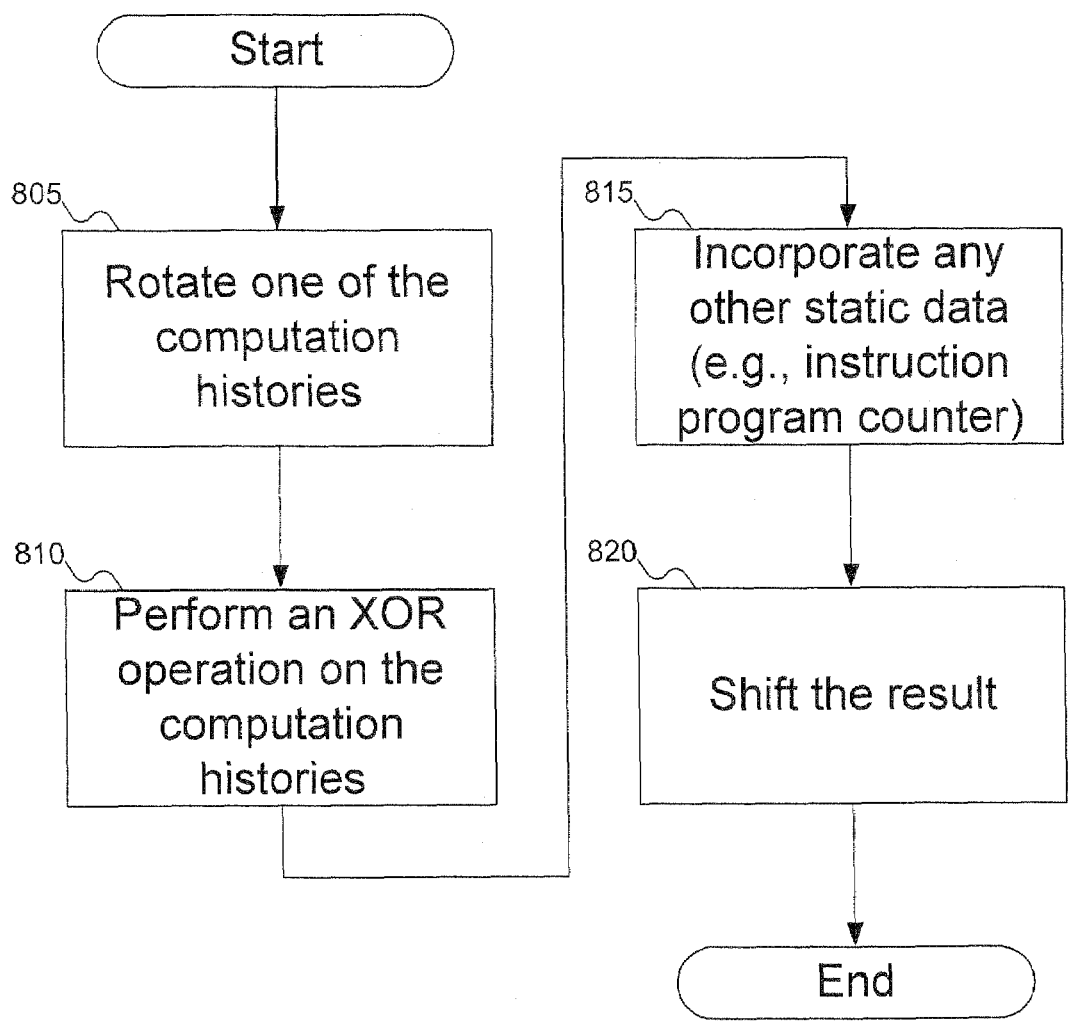
FIG. 8 shows a flowchart of the procedure for using one possible hash function to generate computation histories in the computer system of FIG. 2, according to an embodiment of the invention.

FIG. 8 shows a flowchart of the procedure for using one possible hash function to generate computation histories in the computer system of FIG. 2, according to an embodiment of the invention. At block 805, the computation history for one of the source operands is rotated. At block 810, the computation histories are combined using an exclusive OR (XOR) operation. At block 815, any other static data may be factored into the computation history: for example, the program counter of the instruction. Finally, at block 820, the result is shifted, to age the computation history.

Figure 9:
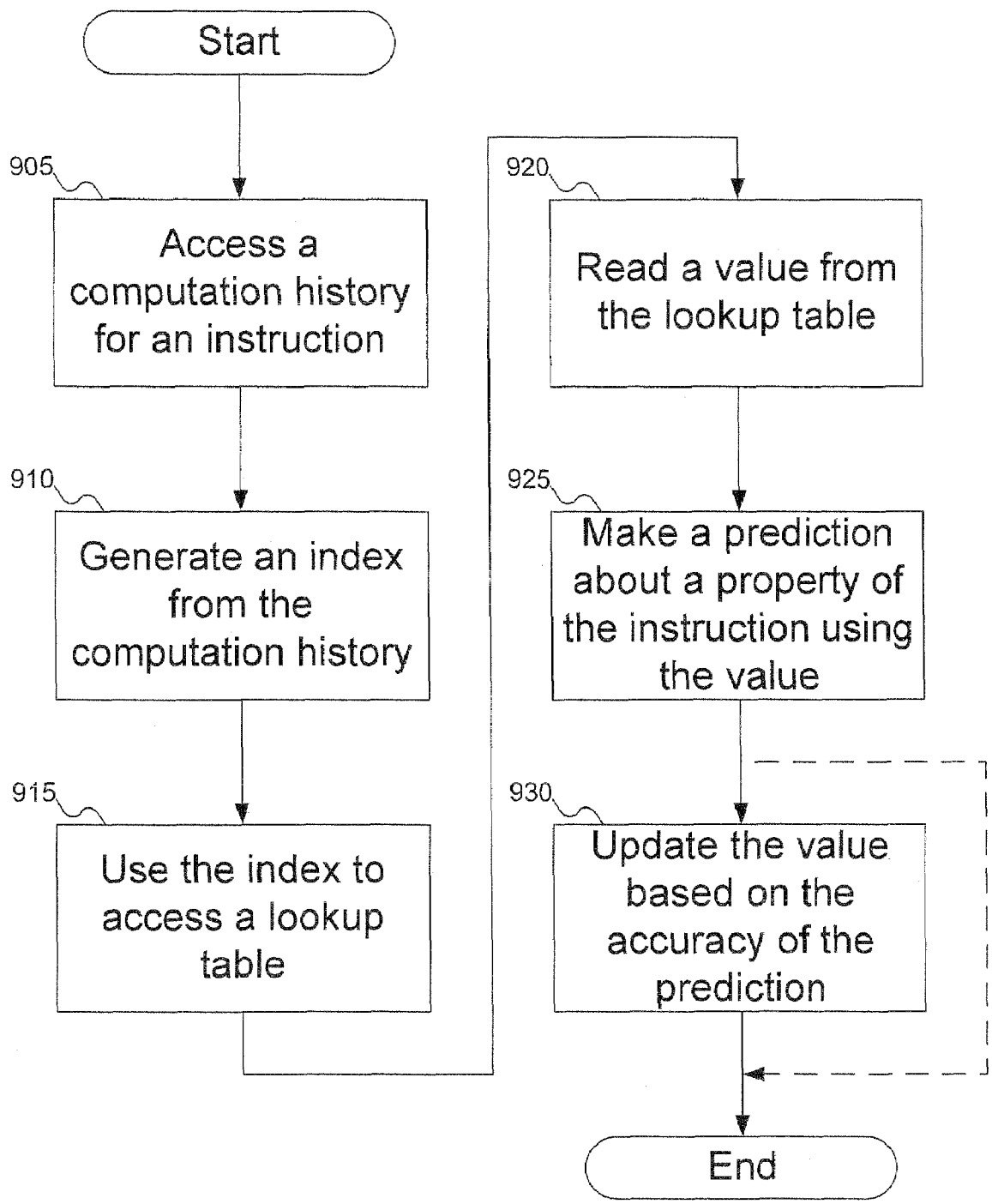
FIG. 9 shows a flowchart of the procedure for using a computation history to make a prediction about a property of an instruction in the computer system of FIG. 2, according to an embodiment to the invention.

FIG. 9 shows a flowchart of the procedure for using a computation history to make a prediction about a property of an instruction in the computer system of FIG. 2, according to an embodiment of the invention. At block 905, a computation history is accessed for the instruction. Typically, if the instruction has a destination register, the computation history taken is the one associated with the destination register of the instruction. For instructions that do not have a destination register (e.g., a branch instruction), the computation history taken is one associated with a source register of the instruction. At block 910, an index is generated from the computation history. At block 915, the index is used to access a lookup table. At block 920, a value is read from the lookup table. At block 925, a prediction is made about a property of the instruction, using the value read from the lookup table. Finally, at block 930, the value of the lookup table may be (optionally) updated, once the truth about the prediction is known.

A person skilled in the art will recognize that an embodiment of the invention described above may be implemented using a computer. In that case, the method is embodied as instructions that comprise a program (in this case, instructing a central processing unit how to execute programs). The program may be stored on computer-readable media, such as floppy disks, optical disks (such as compact discs), fixed disks (such as hard drives), random access memory (RAM), read-only memory (ROM), or flash memory. The program may then be executed on a computer to implement the method. A person skilled in the art will also recognize that an embodiment of the invention described above may include a computer-readable modulated carrier signal, and that the program, or portions of its execution, may be distributed over multiple computers in a network.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A processor, comprising:
   a computation history generator to generate a computation history corresponding to an instruction, the computation history comprising a computation history of an operand, in which the computation history of the operand comprises static data that is known at a time when a program that includes the instruction is compiled; and
   a predictor to generate a prediction pertaining to a property of said instruction using said computation history, the predictor including a storage area to store said prediction pertaining to said property of said instruction, the storage area including a lookup table to store at least one prediction pertaining to a property of at least one instruction, said at least one instruction including said instruction, the property of the at least one instruction including a direction of said instruction, where said instruction is a branch instruction.

2. A processor according to claim 1, further comprising an index storage area to store an index derived from said computation history, said index used to access said prediction pertaining to said property of said instruction.

3. A processor according to claim 2, further comprising logic to reduce a length of said computation history to derive said index.

4. A processor according to claim 1, further comprising logic to update said prediction in the lookup table.

5. A processor according to claim 1, further comprising logic to update said prediction in the storage area.

6. A processor according to claim 1, wherein said computation history may be generated using a set of data values, each data value representing an object having an effect on said instruction.

7. A system, comprising:
   a memory to store an instruction;
   logic to generate a computation history corresponding to the instruction, the computation history comprising a computation history of an operand;
   a predictor to generate a prediction pertaining to a property of the instruction using the computation history; and
   a storage area to store the prediction, the storage area including a lookup table to store at least one prediction pertaining to a property of at least one instruction, the at least one instruction including the instruction, the at least one prediction pertaining to a direction of the instruction, in which the instruction is a branch instruction.

8. A system according to claim 7, further comprising a processor, said processor including the logic to generate said computation history and the storage area to store said prediction.

9. A system according to claim 8, further comprising a network interface coupled to the processor.

10. A system according to claim 7, further comprising an index storage area to store an index derived from said computation history, said index used to access said prediction pertaining to said property of said instruction.

11. A system according to claim 7, further comprising logic to update said prediction in the storage area.

12. A system according to claim 7, wherein the memory includes the storage area.

13. A system according to claim 7, further comprising a computation history file to store the computation history.

14. A system according to claim 7, wherein said computation history may be generated using a set of data values, each data value representing an object having an effect on said instruction.

15. A system according to claim 7, wherein the predictor includes the storage area to store said prediction pertaining to said property of said instruction.

16. The system according to claim 14, wherein the set of data values is static.

17. The processor of claim 1, the computation history of the operand further comprising one or more selected from the group consisting of a current data value in a register, a memory value, and another instruction.

18. The processor of claim 17, in which the computation history of the operand is generated from computation histories of source operands.

19. The processor of claim 1, in which the computation history of the operand consists of static data that is known at a time when a program that includes the instruction is compiled.

20. The system of claim 7, in which the prediction does not depend solely upon a previous outcome of the instruction.

21. A processor comprising:
   logic to generate a computation history for a register that is read by an instruction, the computation history comprising information about an object that affects a current data value in the register; and
   a predictor to generate a prediction pertaining to a property of the instruction using the computation history, the predictor including a storage area to store the prediction, the storage area including a lookup table to store at least one prediction pertaining to a property of at least one instruction, the at least one instruction including the instruction, the at least one instruction pertaining to a direction of the instruction, in which the instruction is a branch instruction.

22. The processor of claim 21, the computation history comprising a value from another register.

23. The processor of claim 22, the computation history comprising a memory value.

24. The processor of claim 21, further comprising logic to update the prediction in the lookup table.

* * * * *